(12) United States Patent
Bishell

(10) Patent No.: US 11,872,662 B2
(45) Date of Patent: Jan. 16, 2024

(54) APPARATUS, SYSTEMS AND KITS FOR LOOSENING AND RETORQUING HYDRAULIC CYLINDER PISTON-RETAINING NUTS

(71) Applicant: 1403871 Alberta, Consort (CA)

(72) Inventor: Jason Bishell, Consort (CA)

(73) Assignee: 1403871 Alberta, Consort (CA)

( * ) Notice: Subject to any disclaimer, the term of this patent is extended or adjusted under 35 U.S.C. 154(b) by 0 days.

(21) Appl. No.: 17/505,933

(22) Filed: Oct. 20, 2021

(65) Prior Publication Data
US 2023/0123076 A1 Apr. 20, 2023

(51) Int. Cl.
B23P 19/06 (2006.01)
B25B 21/00 (2006.01)

(52) U.S. Cl.
CPC .......... B23P 19/065 (2013.01); B25B 21/002 (2013.01)

(58) Field of Classification Search
CPC ....... B23P 19/022; B23P 19/04; B23P 19/043; B23P 19/06; B23P 19/065; B23P 19/066; B23P 19/067; B23P 19/069; B23P 19/10; B25B 21/00; B25B 21/002; B25B 21/005; B25B 23/145; B25B 23/1453; B25B 13/00; B25B 13/48; B25B 13/50; B25B 17/00; B25B 23/00; B25B 23/0078; B25B 23/0085; F15B 15/14; F15B 15/1404; F15B 15/1447; Y10T 29/53687; B62B 3/00; B25H 1/00; B25H 1/0021; B25H 1/0042; B25H 1/005; B25H 1/02; B25H 1/04; B25H 1/08; B25H 1/10; E21B 19/16; E21B 19/161; E21B 19/163
See application file for complete search history.

(56) References Cited

U.S. PATENT DOCUMENTS

| | | | |
|---|---|---|---|
| 3,900,938 A * | 8/1975 | Blomgren, Sr. ........ | B23P 19/04 81/57.39 |
| 4,092,881 A * | 6/1978 | Jurgens ................... | E21B 19/16 81/57.39 |
| 4,552,041 A * | 11/1985 | Coyle, Sr. ............. | E21B 19/166 81/470 |
| 4,723,348 A * | 2/1988 | Jaminet ................. | B25B 21/002 81/57.39 |
| 6,260,252 B1 * | 7/2001 | Wijsman ................. | B23P 19/06 81/57.14 |
| 7,082,858 B2 | 8/2006 | Knopp et al. | |
| 9,492,912 B2 | 11/2016 | Spirer | |
| 10,583,543 B1 | 3/2020 | Tiskevics et al. | |
| 2008/0231029 A1 * | 9/2008 | Hummel ................... | B60R 9/06 224/510 |

(Continued)

*Primary Examiner* — Robert J Scruggs
(74) *Attorney, Agent, or Firm* — Brownstein Hyatt Farber Schreck, LLP

(57) ABSTRACT

The present disclosure generally relates to apparatus, systems, and kits of parts for knock-down heavy-duty transportable torque tool assemblies capable of onsite field-servicing of high-pressure heavy-duty hydraulic cylinders used in heavy-duty construction equipment and industrial machinery. The embodiments disclosed herein pertain to assemblies comprising modular knock-down components that may be mounted onto the bed of a field service truck and configured as needed to provide loosening and retorquing of piston-retaining nuts.

8 Claims, 14 Drawing Sheets

(56) References Cited

U.S. PATENT DOCUMENTS

| | | | | |
|---|---|---|---|---|
| 2009/0229423 A1* | 9/2009 | Myburch | ............ | B25B 23/0085 81/57.11 |
| 2013/0180364 A1* | 7/2013 | Galat | .................. | B25B 23/0085 81/56 |
| 2016/0123011 A1* | 5/2016 | Joseph | .................... | B27F 7/155 269/45 |

* cited by examiner

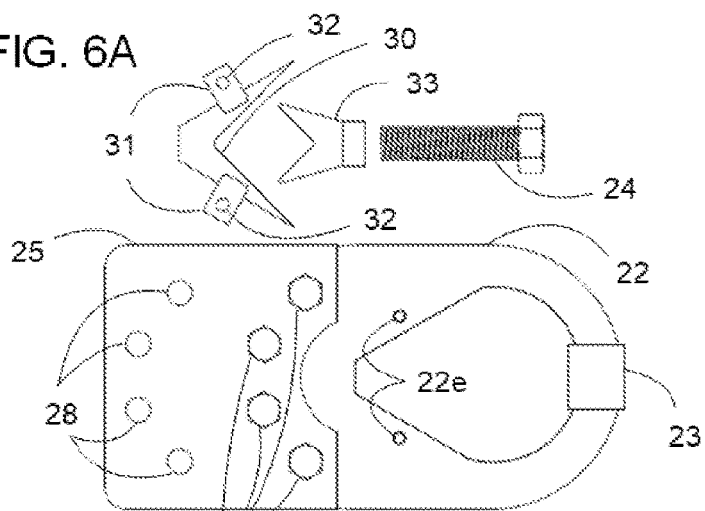
FIG. 6A
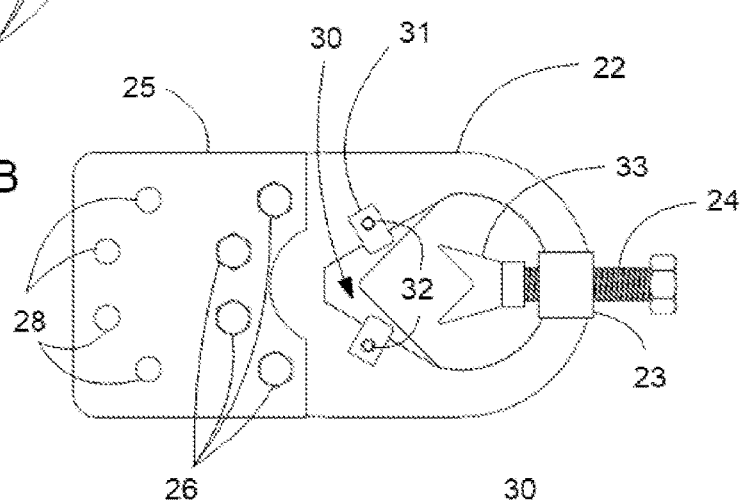
FIG. 6B
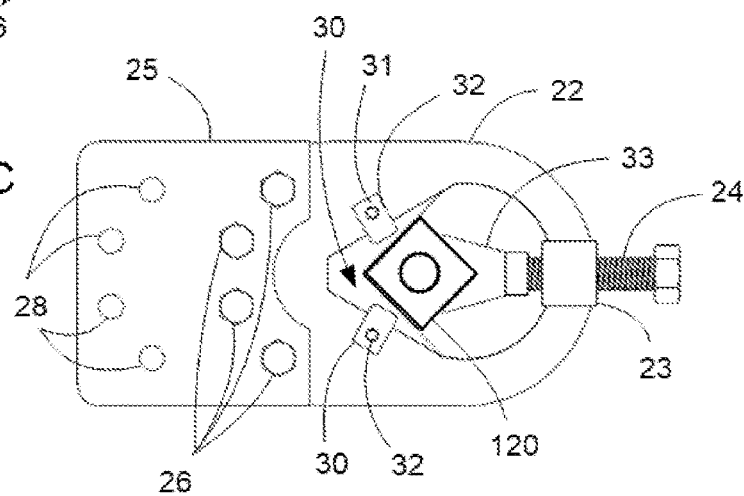
FIG. 6C
FIG. 6

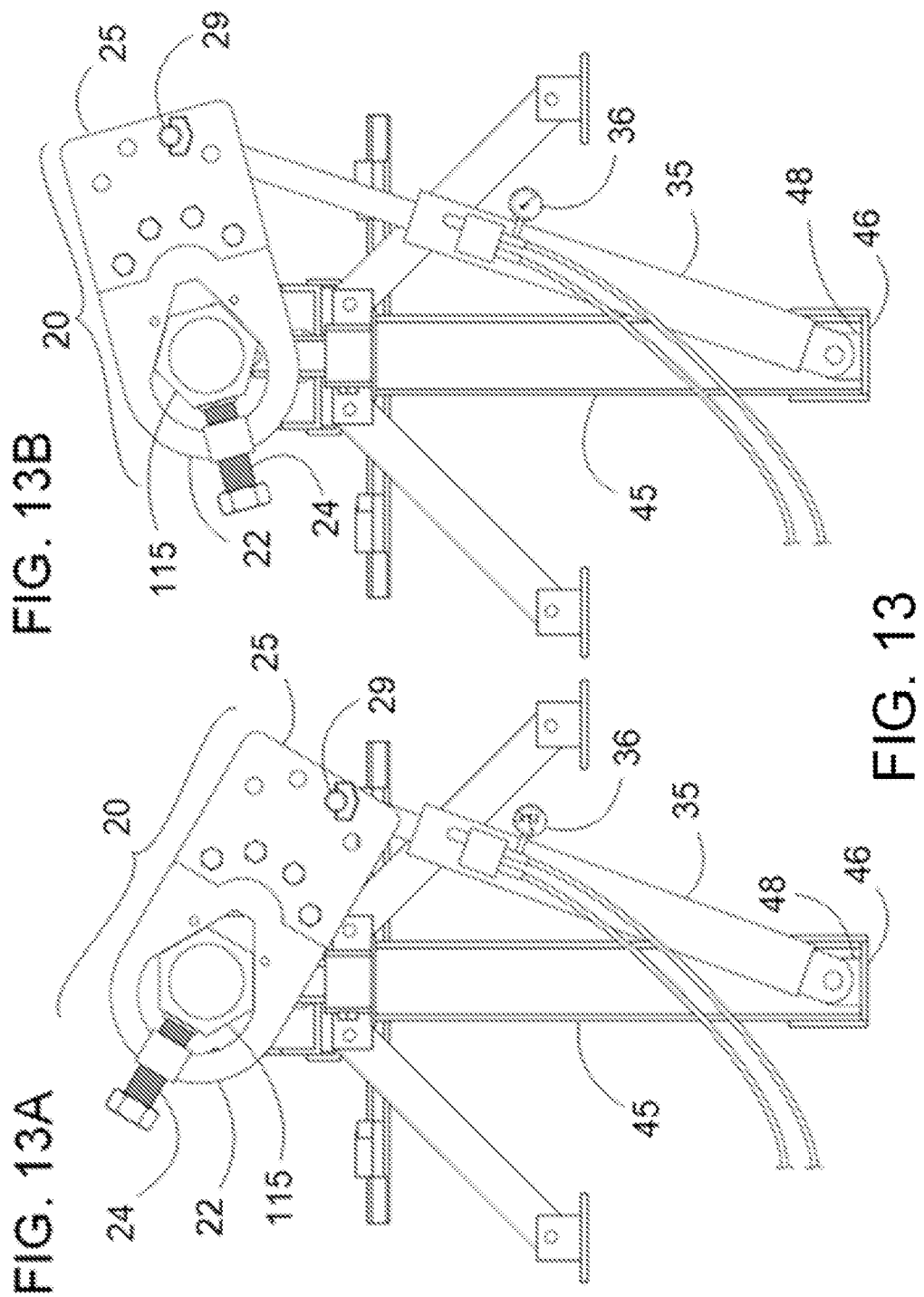

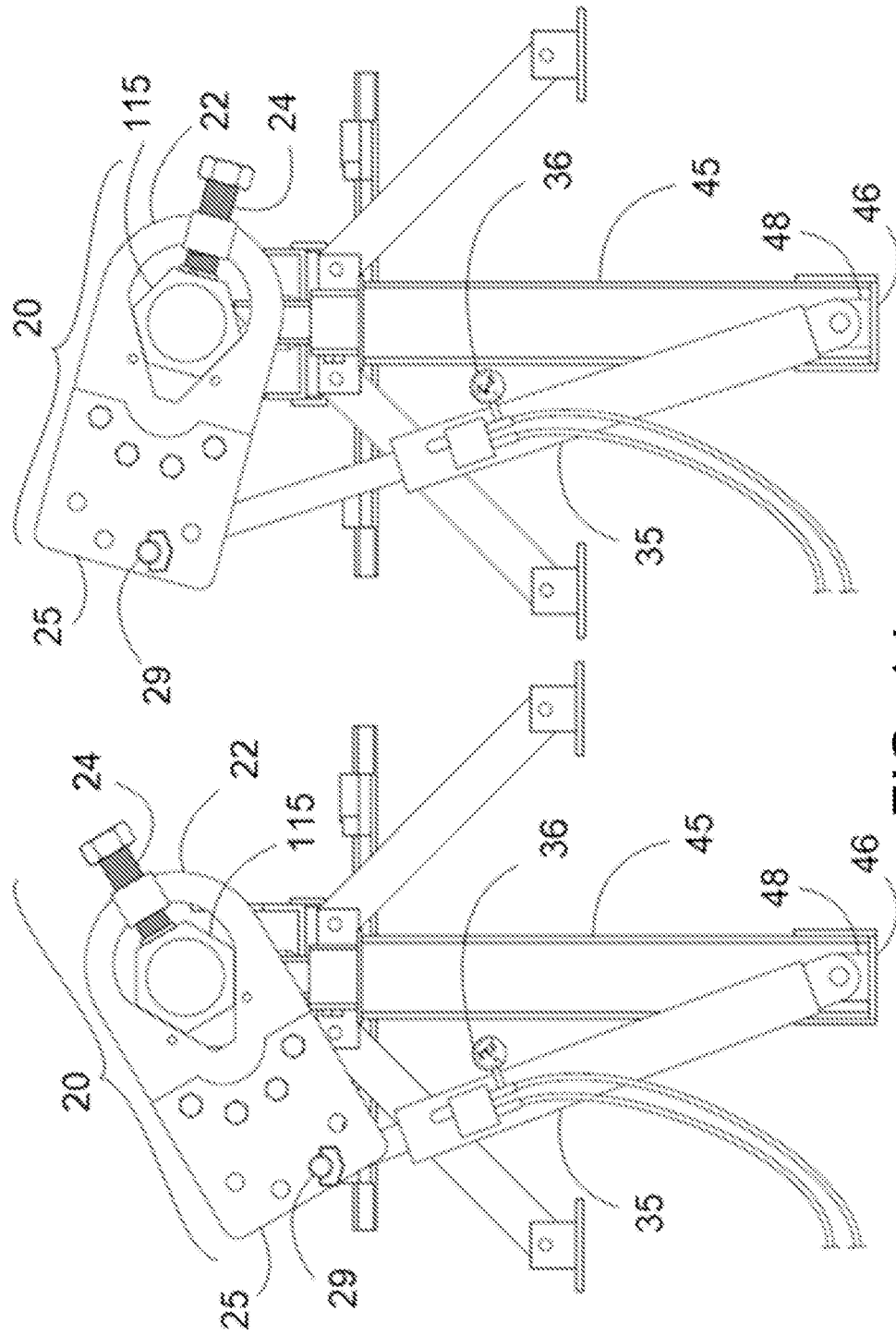

APPARATUS, SYSTEMS AND KITS FOR LOOSENING AND RETORQUING HYDRAULIC CYLINDER PISTON-RETAINING NUTS

TECHNICAL FIELD

The present disclosure generally relates to apparatus, systems, and kits of parts thereof for loosening and retorquing high-pressure hydraulic cylinder piston-retaining nuts. In particular, the present disclosure relates to apparatus comprising assemblies of a torque head component, a hydraulic cylinder for operating the torque wrench head, a support cradle component, and an adjustable, transportable bench for demountable engagement thereinto of high-pressure hydraulic cylinders to be serviced.

BACKGROUND

High-pressure hydraulic cylinders are key components of many types of heavy-duty equipment and machinery used in a variety of industries, including construction, engineering, oil and gas extraction and conveyance, mining, and agriculture. In most cases, high-pressure hydraulic cylinders can be difficult to service and reseal on-site because the hydraulic cylinder piston-retaining nuts must be torqued to about 15,000 pound-foot (lb/ft). Such torqueing requirements for resealing high-pressure hydraulic cylinder piston-retaining nuts are too high for typical conventional tools to loosen or to retorque.

Consequently, when repairs are needed, for example when hydraulic fluid begins leaking through a hydraulic cylinder's piston seals and/or the piston rod seals, the high-pressure hydraulic cylinder typically must be removed from the equipment or machinery, and shipped to a heavy-equipment service shop wherein a stationary heavy-duty hydraulic cylinder service bench is available to loosen and retorque the nut securing the rod-end cap to the hydraulic-cylinder barrel or body. However, this is costly and time consuming as it causes significant onsite down time for the machine or equipment, particularly when the machine or equipment are in use in remote locations where hydraulic cylinder service shops are not available or accessible.

SUMMARY

The present disclosure generally relates to apparatus, systems, and kits of parts for knock-down heavy-duty transportable torque tools capable of onsite field-servicing of high-pressure heavy-duty hydraulic cylinders used in heavy-duty construction equipment and industrial machinery. The embodiments disclosed herein pertain to assemblies comprising modular knock-down torque tool components that may be mounted onto the bed of a field service truck and configured as needed to provide loosening and retorquing of piston-retaining nuts.

In some embodiments, the present disclosure relates to an apparatus comprising a torque head assembly, a hydraulic cylinder and controls to operate the torque tool (also referred to herein as a "torque tool hydraulic cylinder"), and a hydraulic cylinder service bench comprising a slide bed assembly and hydraulic cylinder support assembly, that are demountably engageable with a work bed and a trailer hitch receiver of a field service vehicle. It is to be noted that the hydraulic cylinder support assembly may be referred to as a support cradle assembly. The torque tool hydraulic cylinder may be operatively coupleable at one end to a bracket on a foot pad provided therefor on the hydraulic cylinder support assembly, and at the other end to the torque head assembly. The slide bed assembly may be configured to demountably engage therein one end of a high-pressure hydraulic cylinder requiring service, and the hydraulic cylinder support assembly may be configured to support thereon the other end of the high-pressure hydraulic cylinder during loosening, tightening, and retorquing of one of its piston-retaining nuts.

In an embodiment, the torque head assembly comprises a torque plate provided with an frustoconical-ovoid orifice therethrough wherein (i) the narrow end, also referred to as the heel, of the frustoconical-ovoid orifice is provided with a flat surface, (ii) the outward-tapering sides of the frustoconical-ovoid orifice are flat side walls extending upward at about 120° to the heel of the frustoconical-ovoid orifice, and (iii) the wide end of the frustoconical-ovoid orifice has a round shape and conjoins the upward-extending side walls. The center of the upper end of the frustoconical-ovoid orifice may be provided with reinforcing cuff having a threaded bore therethrough for threadably engaging and disengaging a selected heavy-duty bolt with matching male threads.

In use, one end of the hydraulic cylinder being serviced will be demountably engaged with a slide bed yoke provided therefore on the slide bed assembly component, while the opposite end of the hydraulic cylinder being serviced will be inserted through the frustoconical-ovoid aperture of the torque plate such that two sides of hexagonal piston-retaining will be in contact with the two upward and outward-tapering side-wall surfaces. A bolt may then be threadably engaged through the cuff on the wide end of the aperture until the bolt is compressingly engaged with the side of the nut opposite to the flat surface at the heel of the frustoconical-ovoid aperture. The torque tool hydraulic cylinder may then be operated to provide a sufficient hydraulic pressure to "break" and loosen the end cap nut secured within the frustoconical-ovoid aperture of the torque tool thus facilitating removal of the end cap nut and dismantling of the hydraulic cylinder for service. After new seals and other necessary components are installed, the serviced hydraulic cylinder may then be reassembled after which, the piston-retaining nut may be tightened and retorqued by operating the torque tool hydraulic cylinder to retorque the end cap nut. The frustoconical-ovoid aperture provided in the heavy-duty plate of the torque tool enables releasably securing therein different sizes of hydraulic cylinder piston-retaining nuts. Therefore, in some embodiments, the present disclosure relates to a universal torque head for loosening and tightening a wide variety of different sizes of hydraulic cylinder piston-retaining nuts.

In an embodiment, the present disclosure relates to a torque tool configured for applying torque at selected pressures up to 15,000 pound-foot (lb/ft).

In some embodiments, the present disclosure relates to a system for loosening and tightening a hydraulic cylinder piston-retaining nuts wherein the system comprises the torque tool disclosed herein in cooperation with a hydraulic oil tank, a hydraulic oil pump, a battery for powering the oil pump, and one or more controls for operating the system to loosen and retorque hydraulic cylinder piston-retaining nuts.

In an embodiment, systems of the present disclosure may apply torque at a pressure up to 15,000 pound-foot (lb/ft).

In some embodiments, the present disclosure relates to use of the apparatus and systems disclosed herein to service high-pressure hydraulic cylinders in onsite work locations wherein heavy-duty equipment and/or machinery are in use.

In some embodiments, the present disclosure relates to kits of parts for transportable onsite hydraulic cylinder service apparatus for loosening, tightening, and retorquing hydraulic cylinder piston-retaining nuts. The kits comprise a torque head assembly, a hydraulic cylinder with a pressure gauge and controls to operate the torque tool, and a hydraulic cylinder service bench comprising a slide bed assembly and hydraulic cylinder support assembly that are demountably engageable with a work-surface bed and a trailer hitch receiver of a field service vehicle. The torque tool hydraulic cylinder may be operatively coupleable at one end to a bracket on a foot pad provided therefor on the hydraulic cylinder support assembly, and at the other end to the torque tool. The slide bed assembly may be configured to demountable engage therein one end of a high-pressure hydraulic cylinder requiring service, and the hydraulic cylinder support assembly may be configured to support thereon the other end of the high-pressure hydraulic cylinder during loosening, tightening, and retorquing of one of its piston-retaining nuts, a pressure gauge for engagement and communication with the hydraulic cylinder, and instructions for assembling the apparatus.

In an embodiment, the kits disclosed herein may additionally comprise a hydraulic oil tank, a hydraulic oil pump, a battery for powering the hydraulic oil pump, and one or more controls for operating the hydraulic cylinder to loosen, tighten, and retorque hydraulic cylinder piston-retaining nuts.

Other embodiments and embodiments of the present disclosure are evident in view of the detailed description provided herein.

BRIEF DESCRIPTION OF THE DRAWINGS

These and other features of the invention will become more apparent from the following description in which reference is made to the appended drawings. The appended drawings illustrate one or more embodiments of the present disclosure by way of example only and are not to be construed as limiting the scope of the present disclosure.

FIG. 6 shows a square-nut adaptor component for the torque head assembly wherein FIG. 6A shows the square-nut adaptor component adjacent to the torque head assembly, FIG. 6B shows the square-nut adaptor component installed into the torque head assembly, and FIG. 6C shows a square nut engaged by the torque head assembly;

FIG. 13 is a front end-view of a knock-down universal torque tool assembly according to some embodiments of the present disclosure, in a position to break and loosen an piston-retaining nut on a hydraulic cylinder requiring service wherein FIG. 13A shows the torque head hydraulic cylinder of the apparatus in a retracted state and FIG. 13B shows the torque head hydraulic cylinder of the apparatus in an extended state; and FIG. 14 shows a front end-view of a knock-down universal torque tool assembly according to some embodiments of the present disclosure, in a position to tighten a nut on a hydraulic cylinder requiring service wherein FIG. 14A shows the hydraulic cylinder of the apparatus in a retracted state and FIG. 14B shows the hydraulic cylinder of the apparatus in an extended state.

DETAILED DESCRIPTION

Figure 1:
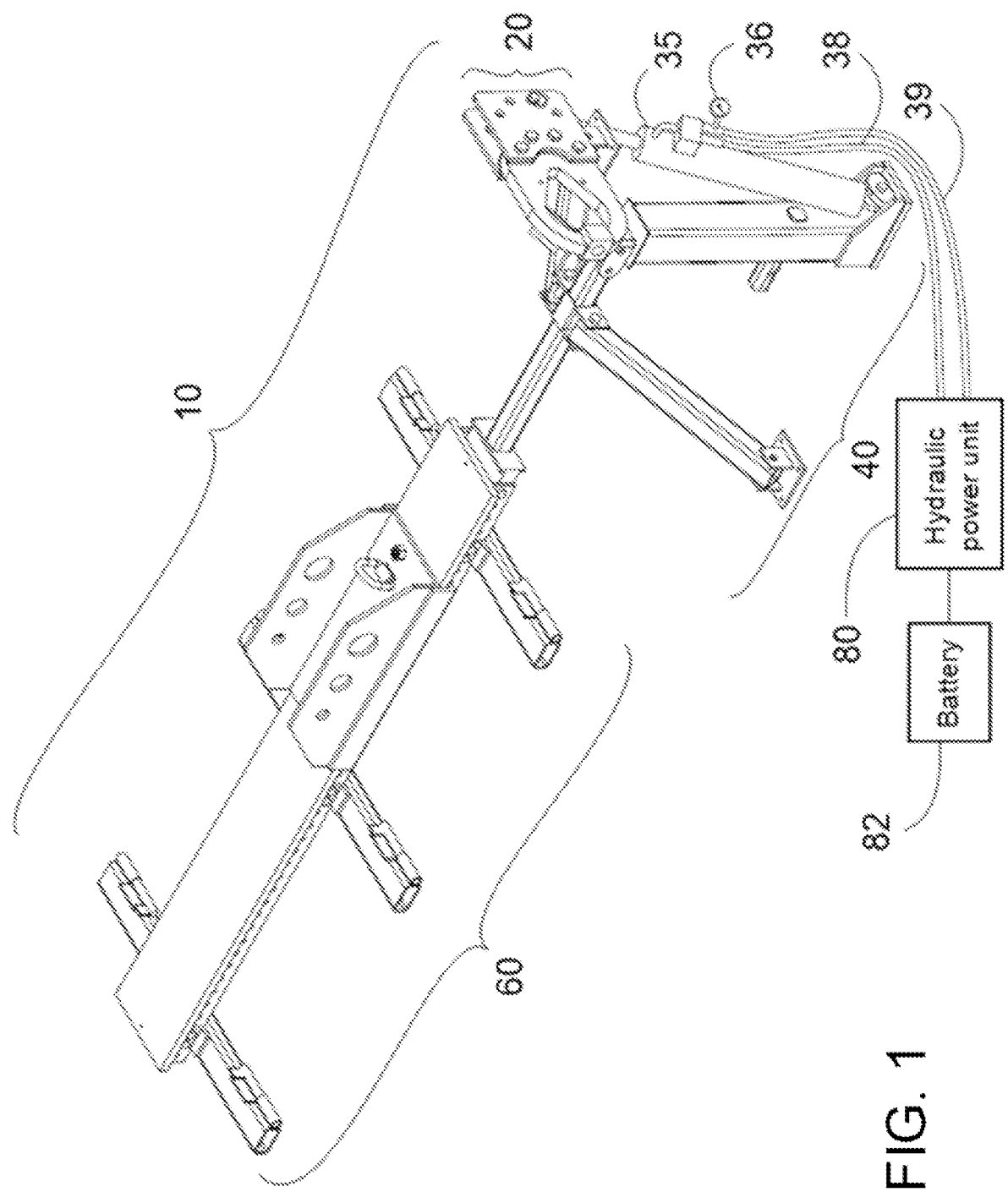
FIG. 1 shows an perspective view of a knock-down universal torque tool assembly configured for servicing hydraulic cylinders on job sites, according to some embodiments of the present disclosure.

Unless otherwise defined, all technical and scientific terms used herein generally have the same meaning as commonly understood by one of ordinary skill in the art to which this disclosure pertains.

The present disclosure relates to portable apparatus and systems for loosening and retorquing an piston-retaining nut of a hydraulic cylinder requiring service. As used herein, the terms "loosening" and "retorquing" with respect to a hydraulic cylinder piston-retaining nut refer to a torque being applied under high pressure in an appropriate direction to loosen or tighten the hydraulic cylinder piston-retaining nut.

In some embodiments, the present disclosure relates to a transportable, knock-down torque tool for loosening and retorquing an piston-retaining nut of a high-pressure heavy-duty hydraulic cylinder during on-site service. The transportable, knock-down torque tool comprises a torque head assembly, a torque head hydraulic cylinder, a hydraulic cylinder support assembly, and a slide bed assembly.

In an embodiment, a torque head assembly includes a torque plate that may be demountable disposed between a pair of torque force plates. The torque plate has a frusto-conical-ovoid aperture at one end and a first plurality of bores therethrough at the other end. Each of the pair of torque force plates has two matching pluralities of bores therethrough wherein the first plurality of bores is aligned with the first plurality of bores provided in the torque plate and the second plurality of bores is communicable with a clevis pin or a king pin. The torque head assembly may be assembled by placing the torque plate between the two torque force plates so that the first pluralities of bores are aligned as will be the second pluralities of bores, then threadably engaging two or more sets of nuts and bolts through the first pluralities of bores.

In an embodiment, the rod end of the torque head hydraulic cylinder is demountably engageable with the torque head assembly by inserting and aligning its rod eye between a selected plurality of second bores in the pair of torque force plates and then inserting a clevis pin therethrough.

In an embodiment, the hydraulic cylinder support assembly includes a cradle support leg with an extendable, retractable hydraulic cylinder support cradle, a horizontal extension brace with one end configured for demountable engagement with the cradle support leg and its other end configured for demountable engagement with the slide deck assembly, and a pair of stabilizing legs that are configured for demountable engagement with the horizontal extension brace. According to an aspect, the cradle support leg has a foot pad with a yoke provided thereon for demountable engagement with a barrel lug at the cylinder end of a torque head hydraulic cylinder.

In an embodiment, the slide bed assembly includes an elongate slide beam to which may be engaged a slide bed yoke, and a plurality of lateral support beams for demountable engagement with the slide beam and with a working surface of a service vehicle. One end of the elongate slide beam is configured for demountable engagement with an end of horizontal extension brace from the hydraulic cylinder support assembly. According to one aspect, the slide bed assembly may include two lateral support beams. According to another aspect, the slide bed assembly may include three lateral support beams. According to another aspect, the slide bed assembly may include four lateral support beams. According to an aspect, the working surface of a service vehicle may be a flat bed. According to another aspect, the working surface of a service vehicle may be a floor of a cargo van body mounted FIGS. 1 to 3 show views of a knock-down torque tool apparatus and system for on-site servicing of high-pressure heavy-duty hydraulic cylinders according to some embodiments of the present disclosure, wherein FIG. 1 is an perspective view of the knock-down torque tool assembly, FIG. 2 shows a side view of the knock-down torque tool apparatus and system, and FIG. 3 is a front-end view of the knock-down torque tool apparatus and system.

Figure 2:
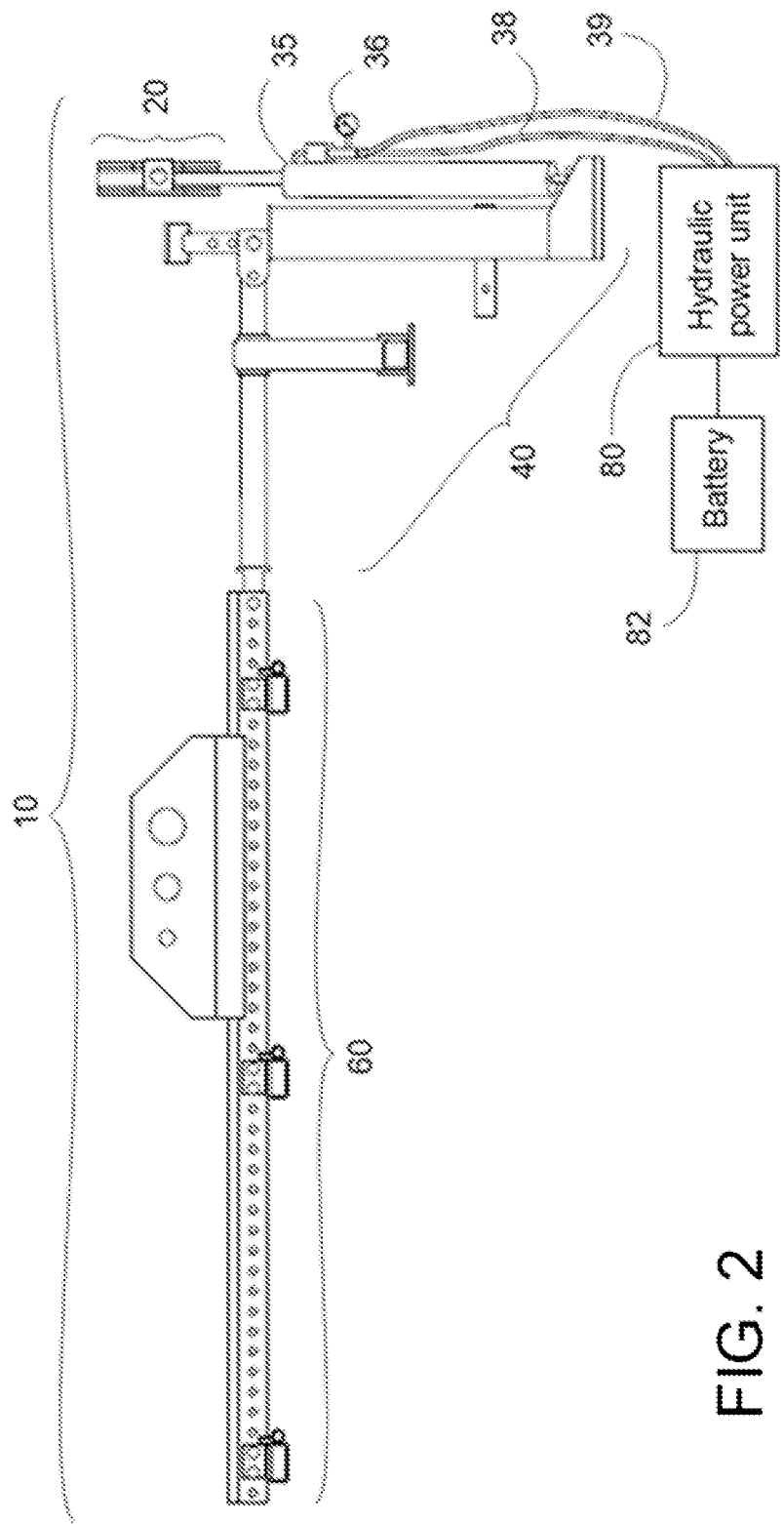
FIG. 2 shows a side view of the apparatus shown in FIG. 1.

As shown in the perspective view of FIG. 1, the knock-down torque tool 10 for comprises a torque head assembly 20, a torque head hydraulic cylinder 35, a hydraulic cylinder support assembly 40, and a slide bed assembly 60. FIG. 1 also illustrates a system for on-site servicing of high-pressure heavy-duty hydraulic cylinders according to some embodiments of the present disclosure wherein the system comprises the apparatus 10, a hydraulic power unit 80, and a battery 82 for powering the hydraulic power unit 80.

Figure 3:
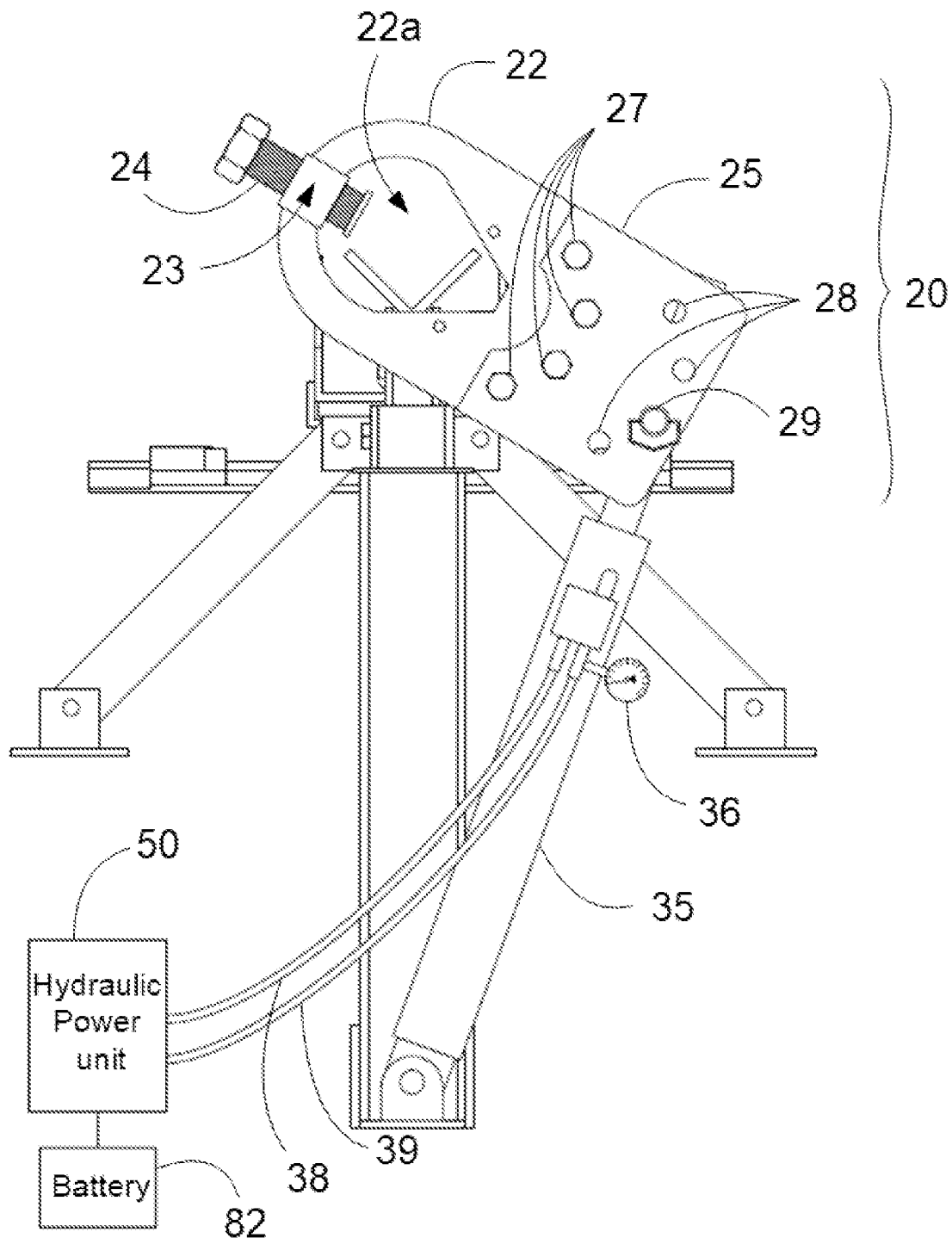
FIG. 3 shows a front-end view of the apparatus a shown in FIG. 1.
Figure 4:
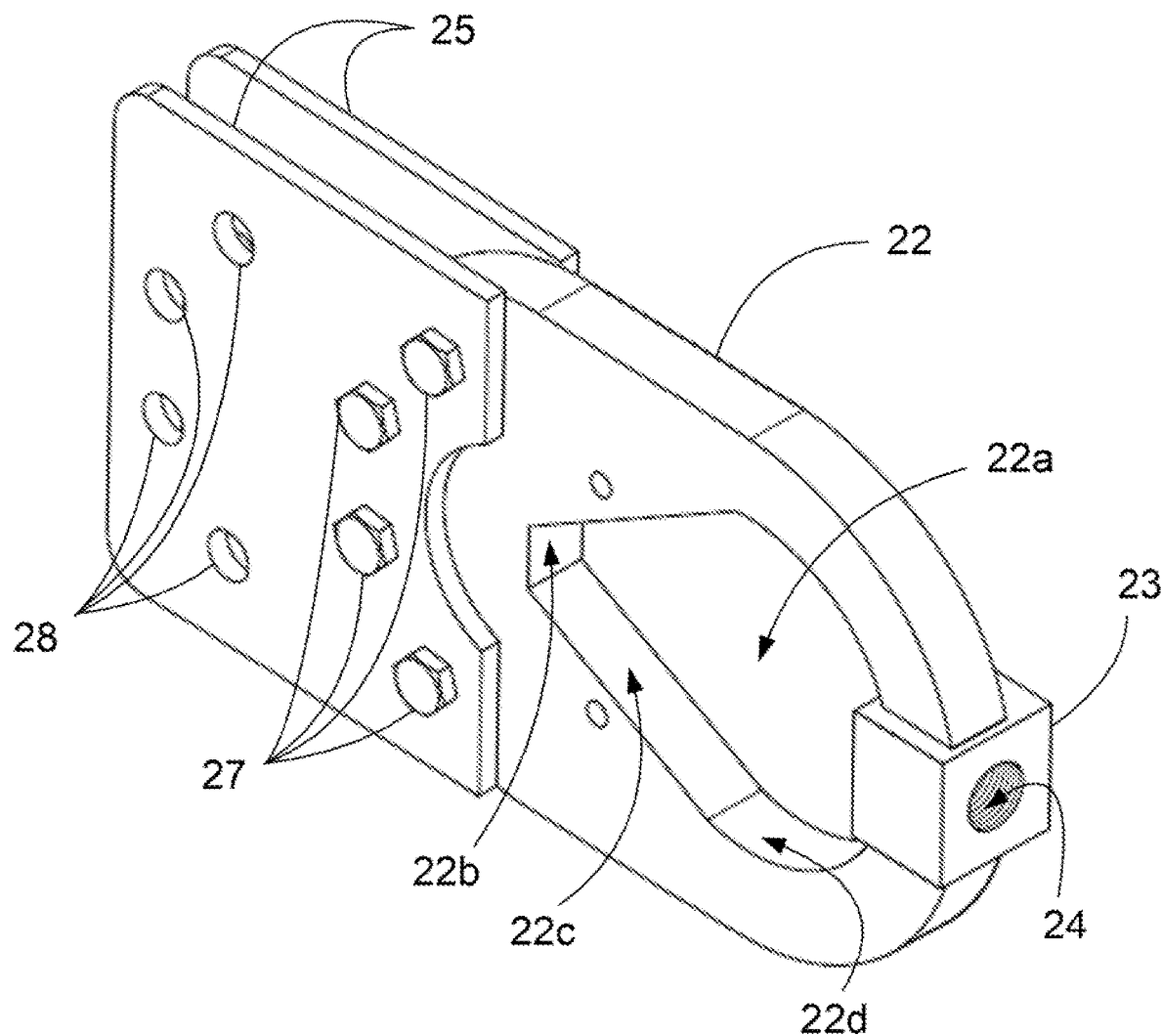
FIG. 4 shows a perspective view of an example of a torque head assembly comprising a torque plate mounted between two torque force plates, according to some embodiments of the present disclosure.
Figure 5:
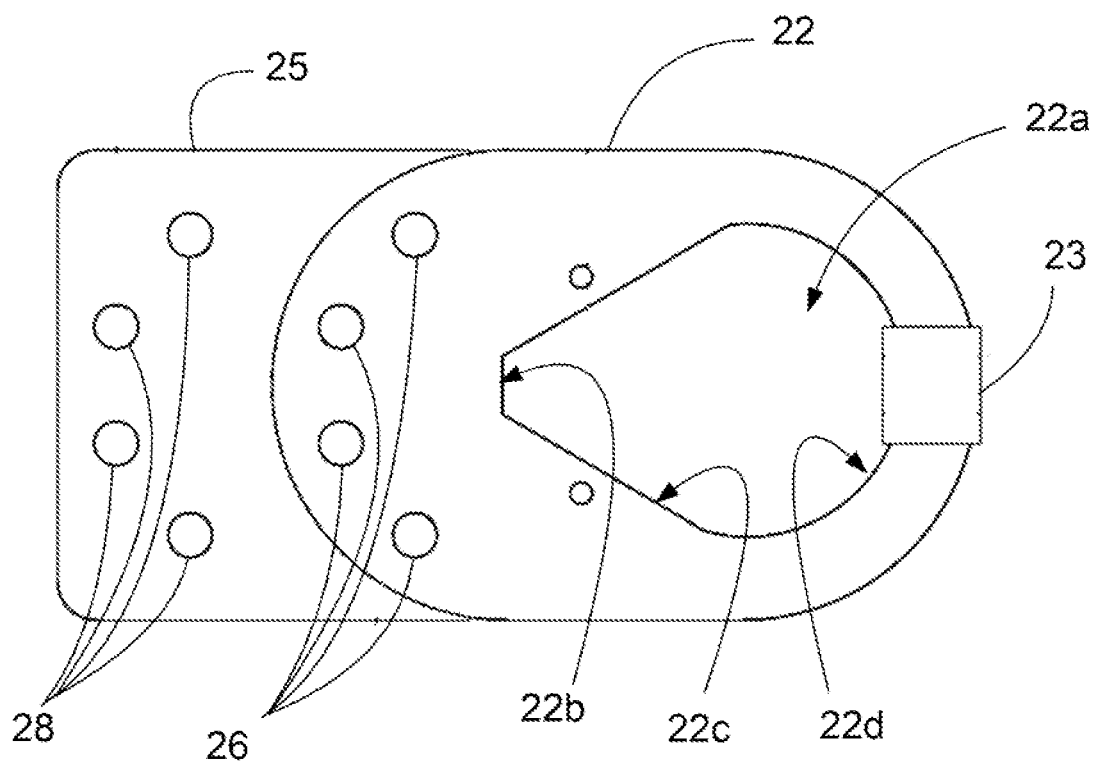
FIG. 5 shows a front view of a torque plate on top of one torque force plate.

FIGS. 3, 4, 5 show an example embodiment of the torque head assembly 20, according to the present disclosure. The torque head assembly 20 comprises a torque plate 22 demountably disposed between two torque force plates 25 by bolts 27 threadably engaged with nuts (not shown). In some embodiments, the torque head assembly 20 have an oblong shape. In some embodiments, the torque plate 22 and torque force plates 24 may be made of a metal or a metallic alloy. In a particular embodiment, the torque plate 22 and torque force plates 24 are made of steel.

The torque plate 22 is provided with frustoconical-ovoid-shaped aperture 22a therethrough for receiving and engaging therein a hexagonal piston-retaining nut of a hydraulic cylinder in need of repair. The frustoconical-ovoid-shaped aperture 22a may be defined by a heel 22b, a pair of upward and outward extending jaws 22c extending outward from the heel 22b at an angle of 120°, and a round rib 22d conjoining the pair of upward and outward extending jaws 22c (FIGS. 3, 4, 5). The torque plate 22 may comprise a torque plate aperture reinforcing cuff 23 centered about the torque plate aperture rib 22d at the end opposite the torque plate aperture heel 22b. The torque plate aperture reinforcing cuff 23 comprises a threaded bore 23a for threadably engaging a bolt 24 therethrough. The torque plate 22 is provided with a first plurality of bores 26 for receiving bolts 27 therethrough that are threadably engaged with nuts (not shown).

The two torque force plates 25 are provided with a first plurality of bores 26 that are aligned with the plurality of bores 26 provided therethrough the torque plate 22, and a second plurality of bores 28. When some or all of the plurality of torque plate bores 26 and the first plurality of force plate bores 26 are aligned, the torque plate 22 may be secured between two torque force plates 25 by threadable engagement of bolts 27 with nuts (not shown. The skilled person will appreciate that bolts 27 may be replaced by other suitable means for securing together the torque plate 22 to the two torque force plates 25, such as rivets.

In some embodiments, the first plurality of torque force plate bores 26 each have a diameter of between about 1 inch and about 2 inches (about 2.5 cm and about 50.8 cm). In an aspect, the first plurality of force plate bores 28 may have a diameter of about 1 inch, about 1.125 inches, about 1.25 inches, about 1.375 inches, about 1.5 inches, about 1.625 inches, about 1.75 inches, about 1.875 inches, or about 2 inches (about 2.5 cm, about 2.9 cm, about 3.2 cm, about 3.5 cm, about 3.8 cm, about 4.1 cm, about 4.4 cm, about 4.8 cm, about 5.1 cm). In a particular embodiment, the first plurality of force plate bores 28 have a diameter of 1.125 inches. Each bore 28 may be spaced by a distance of between about 1 inch and about 4 inches. In an embodiment, the distance between each bore 28 may be about 1 inch, about 1.5 inches, about 2 inches, about 2.5 inches, about 3 inches, about 3.5 inches, or about 4 inches. In a particular embodiment, the distance between each bores is about 3 inches. In some embodiments, the configuration of the first plurality of force plate bores 28 may achieve a 12 inch moment arm on a 3.5 inch hydraulic cylinder piston-retaining nut.

The second plurality of force plate bores 28 provided therethrough the two torque force plates 25 are configured to receive a clevis pin 29 therethrough for demountable engagement with the rod eye of the rod component of a torque head hydraulic cylinder 35 to the two force plates 25. Other securing members, such as kingpin, may be used in place of clevis pins.

The shape of the torque plate frustoconical-ovoid-shaped aperture 22a combined with the bolt 24 enables the torque plate assembly to be securely engaged with three sides of hydraulic cylinder hexagonal piston-retaining nuts from a wide range of widths, for example, about 3.5 inches to about 7 inches (about 8.9 cm to about 17.8 cm).

Another embodiment of the present disclosure pertains to a two-piece square-nut adapter component for demountable engagement with the torque plate frustoconical-ovoid-shaped aperture 22a and bolt 24 is shown in FIG. 6 wherein the first component is a square-nut adapter fixed jaw 30 having two jaw faces at 90°. The square-nut adapter fixed jaw 30 is demountable into the torque plate aperture heel 22b of the torque plate 22 against the pair of outward extending torque plate aperture jaws 22c by pins 32 provided on square-nut adapter mounting plates 31. The pins 32 may be inserted into bores 22e provided therefor in the torque plate 22 (FIGS. 6A, 6B). The second component is a square-nut adapter movable jaw 33 having two jaw faces at 90° and configured to engage and cooperate with the bolt 24 to extend the configured to extend toward and retract from the square-nut adapter fixed jaw 30 to thereby securely engage and release hydraulic cylinder square piston-retaining nuts (FIG. 6C).

In some embodiments, the torque head hydraulic cylinder 35 may comprise a piston having a diameter of between about 1.5 inches (3.8 cm) and about 5 inches (12.7 cm). In some embodiments of the present disclosure, the torque head hydraulic cylinder 35 may comprise a piston having a diameter of 1.5 inches (3.8 cm), 2 inches (5.1 cm), 2.5 inches (6.4 cm), 3 inches (7.6 cm), 3.5 inches (8.9 cm), 4 inches (10.2 cm), 4.5 inches (11.4 cm), or 5 inches (12.7 cm). In a particular embodiment, the torque head hydraulic cylinder 35 comprises a piston having a diameter of 3 inches (7.6 cm). In some embodiments, the torque head hydraulic cylinder 35 comprises a rod of a diameter of between 0.75 inches (1.9 cm) and 1.5 inches (3.8 cm). In an embodiment, the torque head hydraulic cylinder 35 comprises a rod of a diameter of 0.75 inches (1.9 cm), 1.0625 inches (2.7 cm), 1.25 inches (3.2 cm), and 1.5 inches (3.8 cm). In a particular embodiment, the torque head hydraulic cylinder 35 comprises a rod of a diameter of 1.5 inches (3.8 cm). In another particular embodiment, the hydraulic cylinder comprises a piston having a diameter of 3 inches (7.6 cm) and a rod having a diameter of 1.5 inches (3.8 cm). In yet another particular embodiment, the torque head hydraulic cylinder 35 comprises a piston having a diameter of 3 inches (7.6 cm), a rod having a diameter of 1.5 inches (3.8 cm), and a torque arm of a length of 12 inches (30.5 cm).

In some embodiments, the torque head hydraulic cylinder 35 comprises a pressure gauge 36. The pressure gauge 36 can be any gauge suitable for monitoring the pressure being used to actuate the torque head hydraulic cylinder 35. In some embodiments, the hydraulic power unit 80 may comprise a pressure gauge for monitoring the pressure being used to actuation the torque head hydraulic cylinder 35.

Figure 7:
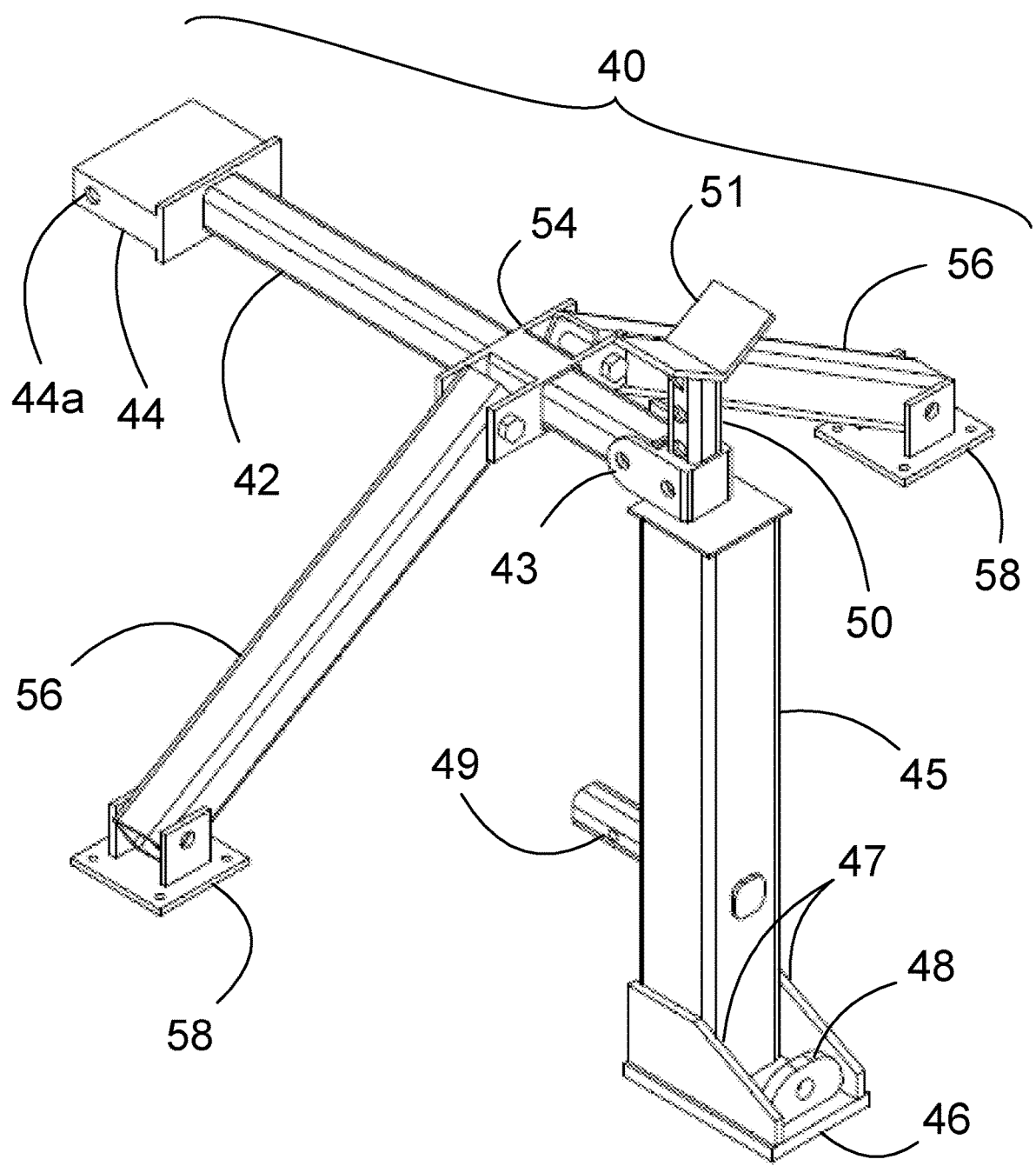
FIG. 7 shows a perspective view of a hydraulic cylinder support assembly, according to some embodiments of the present disclosure.
Figure 8:
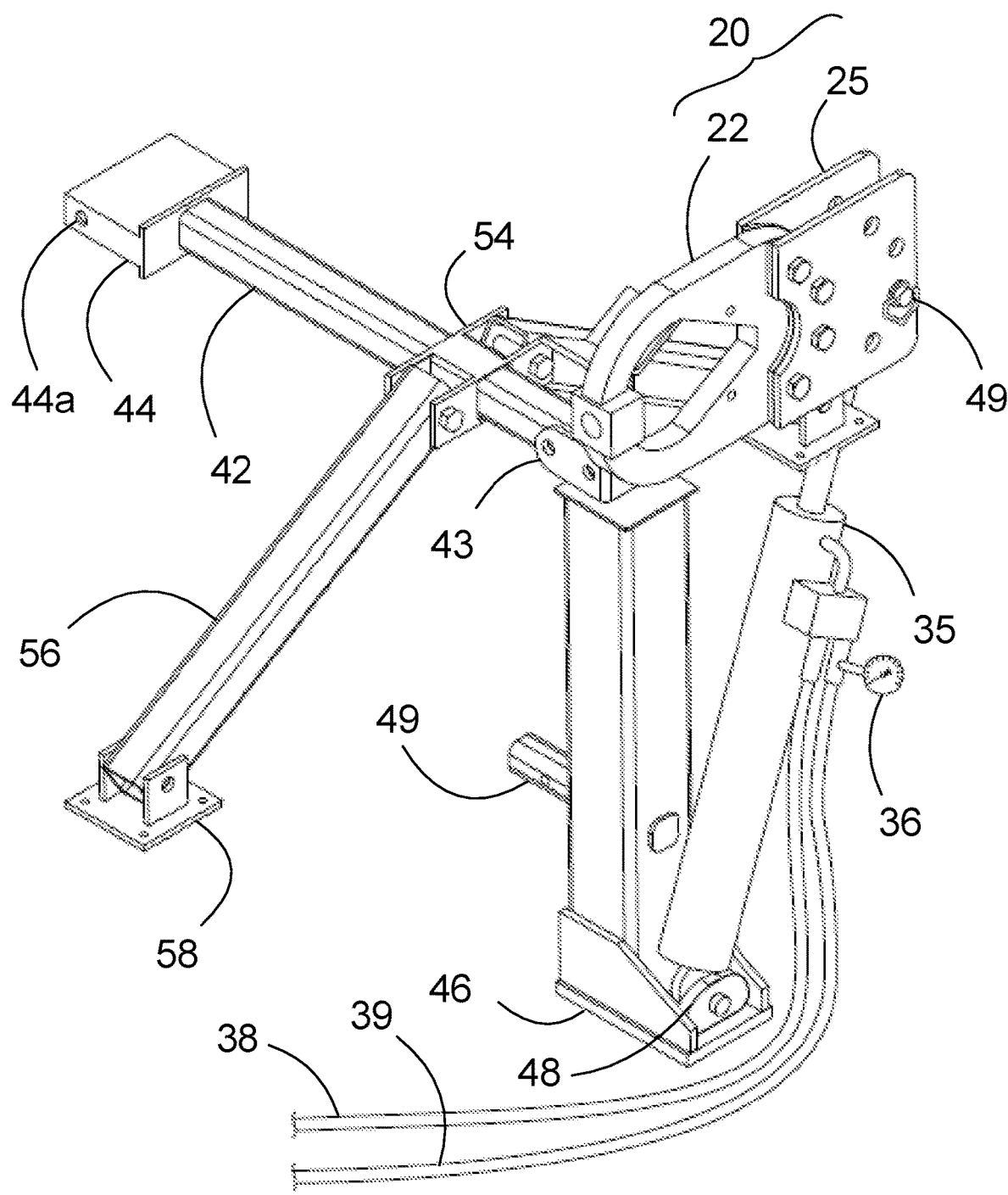
FIG. 8 is a perspective view of a universal torque plate assembly shown in FIGS. 3 and 4 engaged with the hydraulic cylinder support assembly shown in FIG. 7.

FIGS. 7, 8 show an example of a hydraulic cylinder support assembly 40 according to some embodiments of the present disclosure. The hydraulic cylinder support assembly 40 comprises a cradle support leg 45 having an upwardly extendible retractable post 50 disposed therein. The upward end of the extendible retractable post 50 is provided with a hydraulic cylinder support cradle 51 engaged thereto. According to an aspect, the support cradle 51 may be a V-shaped support cradle. The bottom end of the cradle support leg 45 is integrally engaged with a foot pad 46 and a pair of stabilizing gussets 47. A foot pad bracket 48 engaged with the foot pad 46 and having a bore therethrough is provided for demountable engagement with the barrel lug at the cylinder end of torque head hydraulic cylinder 35. A tongue insert 49 for engaging a trailer hitch receiver mounted onto a service vehicle (see FIGS. 11, 12), extends laterally from a side wall of the cradle support leg 45. A laterally extending yoke 43 is integrally engaged with the upper end of the cradle support leg 45, and is provided for demountable engagement with one end of a horizontal extension brace 42. The opposite male end 44 of the horizontal extension brace 42 is provided with a bore 44a therethrough to facilitate demountable engagement of the hydraulic cylinder support assembly 40 with the slide deck assembly 60 (see FIGS. 11, 12). The hydraulic cylinder support assembly 40 additionally comprises a double-sided yoke 54 configured for sliding engagement with the horizontal extension brace 42 and for demountable engagement with a pair of stabilizing legs 56 (FIGS. 7, 8). Each end of each of the pair of stabilizing legs is provided with matching bores there through to enable interchangeable demountable coupling of one end of a stabilizing leg 56 with the double-sided yoke 54 and the other end with a foot pad yoke 58. It is to be noted that the cradle support leg 45, the horizontal extension brace 42, and the stabilizing legs 56 illustrated in FIGS. 7, 8 are fabricated from square tubular steel, other suitable types of tubular steel may be used for these components. For example, these components may be fabricated with rectangular tubular steel or alternatively, with cylindrical tubular steel. The cradle support leg 45 may have a height of between about 24 inches (61 cm) and about 36 inches (91 cm). In some embodiments the cradle support leg 45 may be of a height of about 28 inches (71 cm), about 29 inches (74 cm), about 30 inches (76 cm), about 31 inches (79 cm), about 32 inches (81 cm), about 33 inches (84 cm), or about 34 inches (86 cm).

Figure 9:
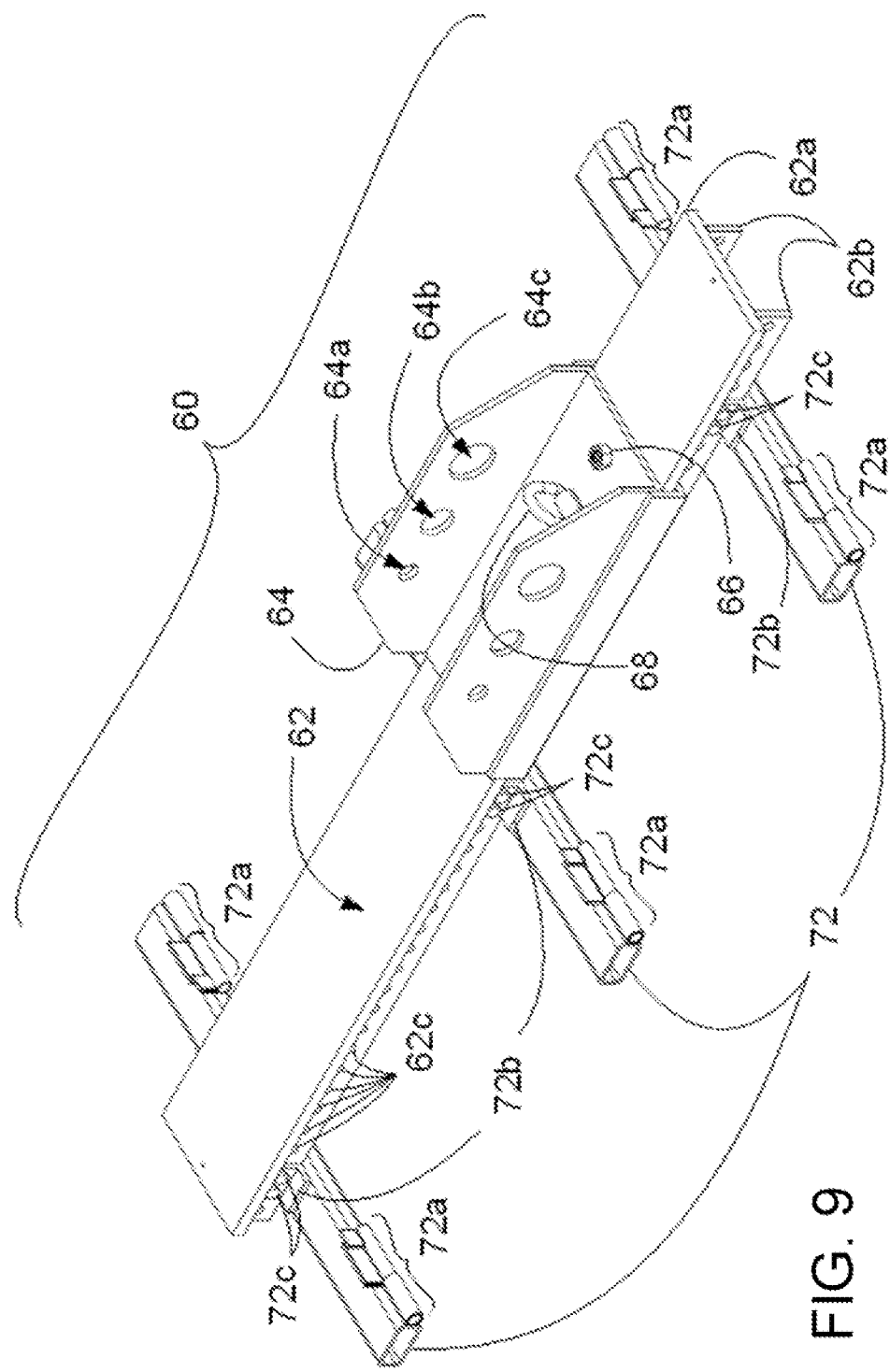
FIG. 9 is a perspective view of an embodiment of a slide bed assembly, according to some embodiments of the present disclosure.
Figure 10:
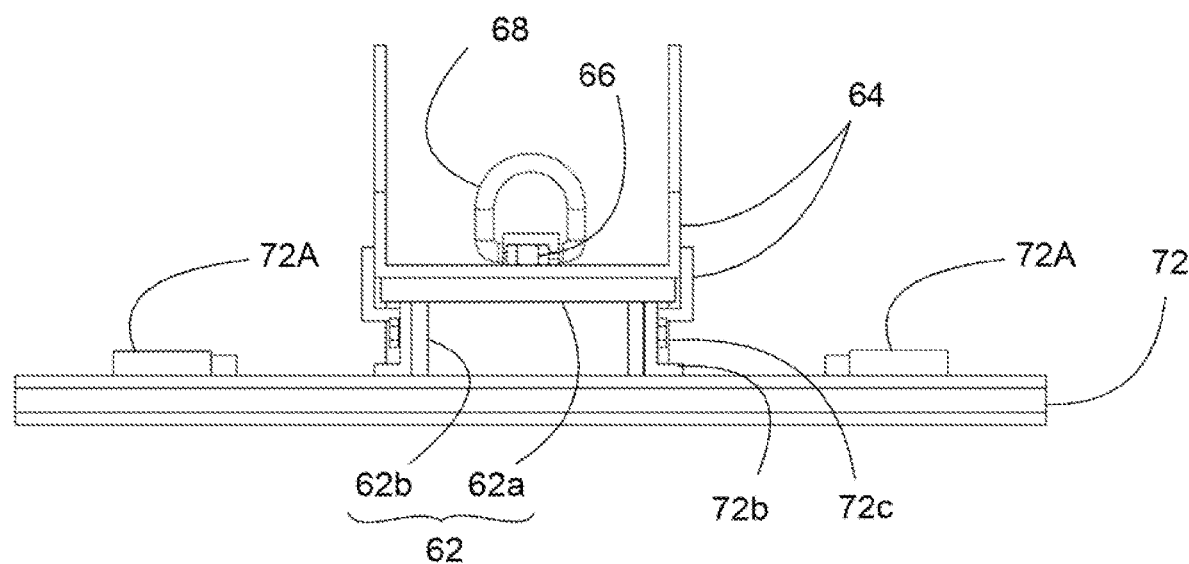
FIG. 10 shows an end view of the slide bed assembly shown in FIG. 7.

FIGS. 9, 10 show a perspective view and an end view, respectively, of an example of a slide bed assembly 60 according to some embodiments of the present disclosure. The slide bed assembly 60 comprises a slide deck 62 provided with a slide bed yoke 64 engaged thereto, and a plurality of slide deck lateral support beams 72 that are demountable engageable with the slide deck 62 and a work bed of a service vehicle.

The slide deck 62 comprises a horizontal metal beam 62a having two downward-extending metal support legs 62b having matching equidistantly spaced bores 62c therealong. In some embodiments, the slide deck beam 62a may have a length selected from about 48 inches (122 cm) to about 72 inches (183 cm). In some embodiments, the slide deck beam 62a may have a length of 48 inches (122 cm), 54 inches (137 cm), 60 inches (152 cm), 66 inches (168 cm), 72 inches (183 cm), and therebetween.

In some embodiments, the width of the slide deck beam 62a may be selected from about 6 inches (15 cm) to about 12 inches (30 cm). In some embodiments, the width of the slide deck beam 62a may be about 6 inches (15 cm), 7 inches (18 cm), 8 inches (20 cm), 9 inches (23 cm), 10 inches (25 cm), 11 inches (28 cm), 12 inches (76 cm), and therebetween.

In some embodiments, the thickness of the slide deck beam 62a may be from about 0.375 inch (1 cm) to about 1.5 inches (3.8 cm). In some embodiments, the thickness of the slide deck beam 62a may be about 0.375 inch (1 cm), 0.5 inch (1.3 cm), 0.75 inch (1.7 cm), 1 inch (2.5 cm), 1.5 inch (10.2 cm), and therebetween.

In some embodiments, the height of the downward-extending slide deck support legs 62b may be from about 2 inches (5.1 cm) to about 4 inches (10.6 cm), and therebetween. In some embodiments, the equidistantly spaced bores 62c have a diameter from about 0.5 inch (1.3 cm) to about 1 inch (2.5 cm) and therebetween. In some embodiments, the equidistantly spaced bores 62c are spaced longitudinally along the slide deck support legs 62b at a distance between centers of about 1 inch (2.5 cm) to about 3 inches (7.6 cm) and therebetween. In a particular embodiment, the equidistantly spaced bores 62c are spaced longitudinally along the slide deck support legs 62b at a distance between centers of 2 inches (5.1 cm).

It is to be noted that the downward-extending slide deck support legs 62b should be spaced-apart a suitable distance so that during assembly of the torque tool 10 on a work surface of a service vehicle at a service site, the male insert end 44 of the horizontal extension brace 42 of the hydraulic cylinder support assembly will sliding engage the end of the slide deck 62 and be secured in place by a bolt inserted through the matching bores 62c at the ends of the downward-extending support legs 62b and an aperture 44a provided therefor through the male insert end 44 of the horizontal extension brace 42.

Figure 11:
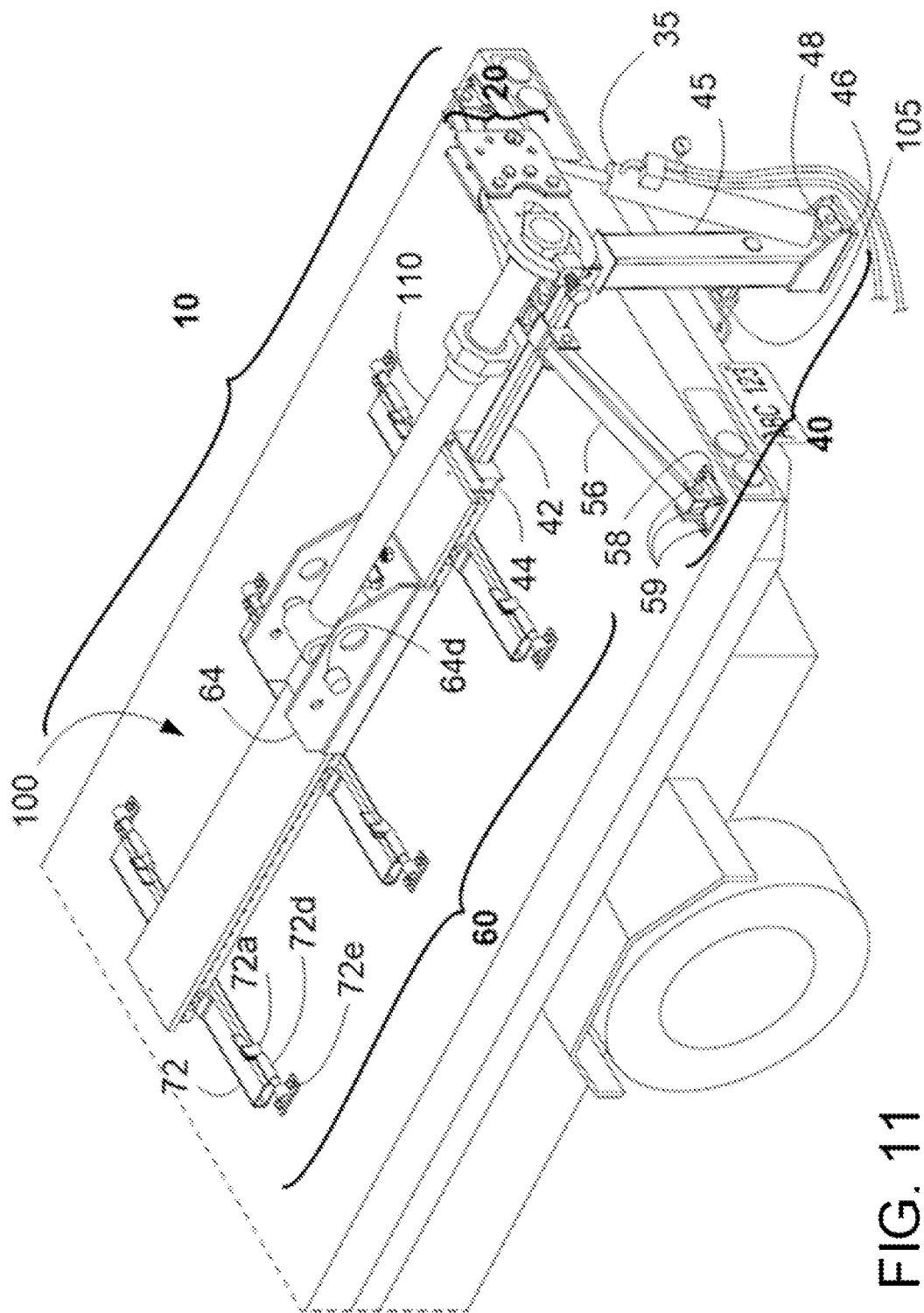
FIG. 11 is a perspective view of the knock-down universal torque tool assembly configured for servicing hydraulic cylinders illustrated in FIGS. 1 to 8, mounted onto the bed of a field service truck.
Figure 12:
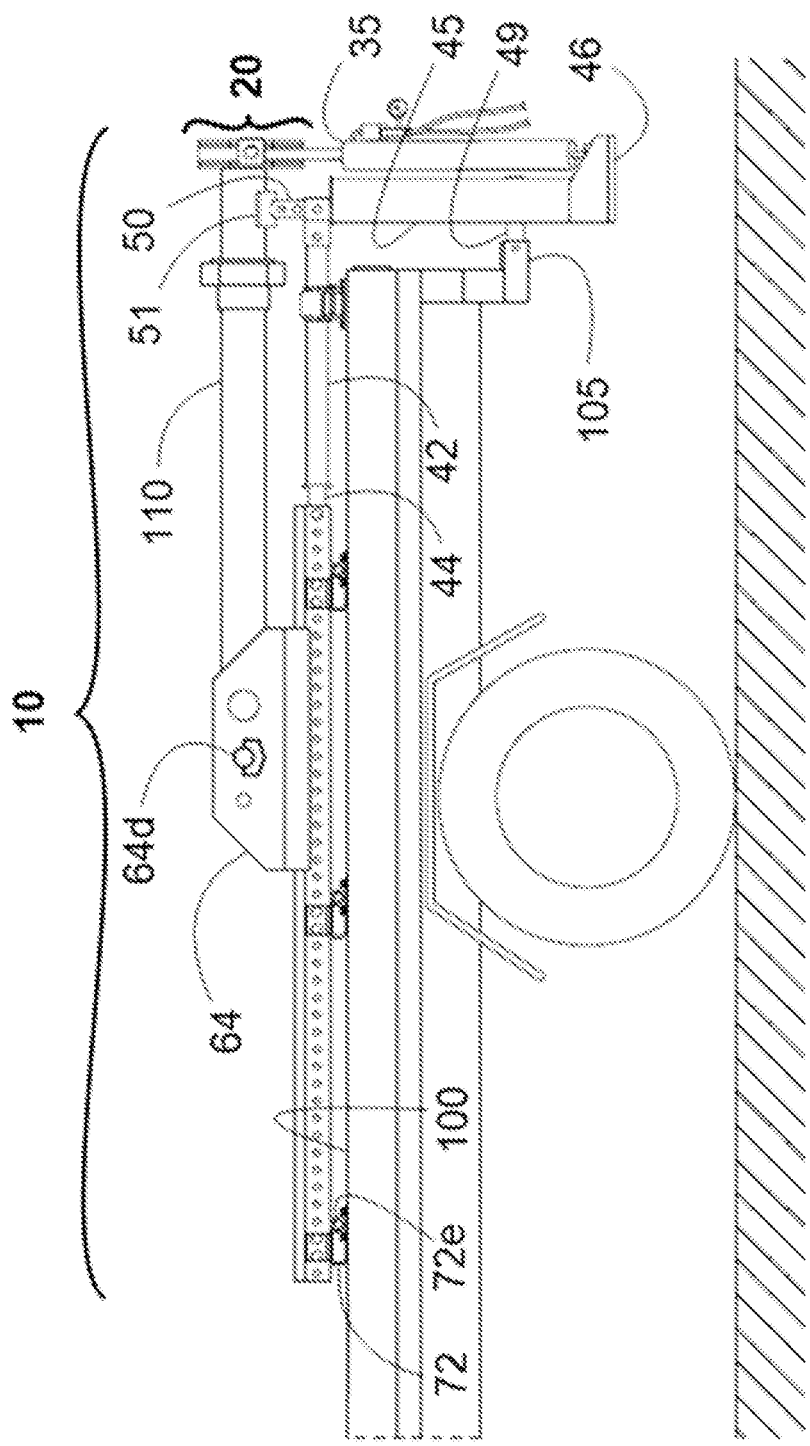
FIG. 12 shows a side view of the knock-down universal torque tool assembly mounted to the field service truck shown in FIG. 11.

The slide deck 62 is demountably engageable with a plurality of lateral support beams 72, which in turn, are demountably engageable with a working bed 100 of a field service vehicle (FIGS. 11, 12).

The lateral support plates 72 may be solid bars or hollow beams. In some embodiments, the slide deck 62 may be demountable engaged to the lateral support beams 72 by brackets 72b welded to the lateral support beams. In these embodiments, the slide deck 62 may be secured to the brackets 72b with hex bolts 72c and nuts (not shown). In some embodiments, the brackets 72b may be welded to the slide deck support legs 62b.

In some embodiments, the lateral support beams 72 may be demountably engaged with the working bed surface of a service vehicle by inserting pins 72d through mounting brackets 72a provided therefor on the lateral support beam 72, and receiving brackets 72e provided therefor on the working bed surface 100 of a field service truck (FIGS. 11, 12). The skilled person will appreciate that the lateral support beams 72 may be demountably engaged with the work surface of a service vehicle by other suitable means such as U-clamps, bolted-down clips, and the like.

The slide bed yoke 64 engaged with the slide deck 62 may be provided with a first pair of bores 64a to slidingly receive a barrel lug at the cylinder end of hydraulic cylinder to be serviced wherein the barrel lug has a first diameter, a second pair of bores 64b to slidingly receive a barrel lug at the cylinder end of hydraulic cylinder to be serviced wherein the barrel lug has a second diameter, and a third pair of bores 64c to slidingly receive a barrel lug at the cylinder end of hydraulic cylinder to be serviced wherein the barrel lug has a third diameter (FIGS. 9, 11, 12). The slide bed yoke 64 may further comprise a D-ring 68 (FIGS. 9, 10) for lowering and raising the slide deck assembly 60 to/from the work bed of a service truck, or alternatively, lowering and raising the slide deck 62 and slide deck yoke 64 to/from the lateral support beams 72 that may have been previously demountably engaged with the work bed of a service truck.

In some embodiments, the present disclosure relates to a system for servicing a high-pressure heavy-duty hydraulic cylinder on a job site, wherein the system comprises an assembled knock-down torque tool 10 including a torque head assembly 20, a torque head hydraulic cylinder 35 with a pressure gauge 36, a hydraulic cylinder support assembly 40, and a slide bed assembly in communication with a hydraulic power unit 80 and a battery 82 operatively coupled to the torque head hydraulic cylinder 35 by inlet and outlet hydraulic hoses 36, 36, respectively. The battery 82 for powering hydraulic power unit 80 may be any suitable battery, such as for example, an 18 VDC lithium-ion battery or a 12V automobile battery.

In some embodiments of the present disclosure, the system may be configured to apply a torque force of between 0 foot pounds and 15,000 foot pounds to a hydraulic cylinder piston-retaining nut.

FIG. 13 shows a front end view of knock-down torque tool 10 assembled as illustrated in FIGS. 11, 12, for on-site servicing of hydraulic cylinder 110. FIG. 13A shows the torque head hydraulic cylinder 35 coupled to the two torque force plates 25 by clevis pin 29. The end cap 115 of the hydraulic cylinder 110 requiring service is shown tightly engaged to the torque plate 22 by bolt 24. The hydraulic power unit 80 is then operated to pressurize the torque head hydraulic cylinder 35 to provide a sufficient pressure to the torque head assembly 20 to thereby break, loosen, and rotate the piston-retaining nut 115 to the position shown in FIG. 13B. Bolt 29 may then be threadably disengaged from the piston-retaining nut 115, after which the torque head assembly 20 may be removed from hydraulic cylinder 110 being serviced. The piston-retaining nut 115 may then be removed from hydraulic cylinder 110 to enable repairs and replacement of component parts.

FIG. 14 shows the knock-down torque tool 10 shown in FIG. 13, in a position for retorquing hydraulic cylinder nut 115 after the hydraulic cylinder 110 has been serviced and reassembled. After the piston-retaining nut 115 has been hand-tightened to the hydraulic cylinder 110, the torque tool assembly is placed around the piston-retaining nut 115 after which, bolt 24 is threadably engaged with the torque plate 22 to tightly secure the piston-retaining nut 115 between the bolt 24 and torque plate 22. Then, hydraulic power unit 80 is then operated to pressurize the torque head hydraulic cylinder 35 to provide a sufficient pressure to the torque head assembly 20 to thereby retorque the piston-retaining nut 115. Those skilled in this art will know that suitable torque pressure may be selected from a range of about 10,000 lb/ft to about 15,000 lb/ft.

While the embodiments shown in FIGS. 13, 13 show the torque head hydraulic cylinder 35 and the torque head assembly 20 in different orientations with respect to the cradle support leg 45, the skilled person will appreciate that the loosening and/or tightening may be achieved by a configuration where the torque head hydraulic cylinder 35 is operatively connected to the two torque force plates 25 in an extended state and the tightening and/or loosening occurring as the torque head hydraulic cylinder 35 is moved to a retracted state. Such an embodiment may occur, for example, when a lower torque is required to tighten or loosen the hydraulic cylinder nut.

In some embodiments of the present disclosure, the apparatus and systems disclosed herein may be configured to apply the torque values listed in Table 1.

TABLE 1

Torque values achievable by a given pressure using a hydraulic cylinder with a 3" diameter piston and a 1.5" diameter rod.

| Torque (lbft) | Pressure (PSI) |
| --- | --- |
| 500 | 95 |
| 1000 | 189 |
| 1500 | 283 |
| 2000 | 377 |
| 2500 | 472 |
| 3000 | 566 |
| 3500 | 661 |
| 4000 | 755 |
| 4500 | 850 |
| 5000 | 944 |
| 5500 | 1038 |
| 6000 | 1132 |
| 6500 | 1226 |
| 7000 | 1321 |
| 7500 | 1415 |
| 8000 | 1509 |
| 8500 | 1603 |
| 9000 | 1698 |
| 9500 | 1792 |
| 10000 | 1887 |
| 10500 | 1981 |
| 11000 | 2075 |
| 11500 | 2170 |
| 12000 | 2264 |
| 12500 | 2358 |
| 13000 | 2453 |

TABLE 1-continued

Torque values achievable by a given pressure using a hydraulic cylinder with a 3" diameter piston and a 1.5" diameter rod.

| Torque (lbft) | Pressure (PSI) |
|---|---|
| 13500 | 2547 |
| 14000 | 2642 |
| 14500 | 2736 |
| 15000 | 2830 |

In some embodiments, the present disclosure relates to a kit of parts for a knock-down torque tool comprising components to configure a torque head assembly, a torque head hydraulic cylinder, components to configure a hydraulic cylinder support assembly, components to configure a slide bed assembly, and assembly instructions. According to an embodiment, the components for a torque head assembly may include a torque plate, a pair of torque force plates, and a plurality of bolts and nuts to demountably engage the torque plate between the torque force plates.

According to an embodiment, the kit may additionally include a pressure gauge for the torque plate hydraulic cylinder.

According to an embodiment, the components for the hydraulic cylinder support assembly may include:
a tubular cradle support leg having (i) a foot pad and bracing gussets welded to its bottom end and a bracket having a bore for receiving therethrough a clevis welded to the foot plate, (ii) having a yoke welded to its top end, and (iii) a tongue insert for demountable engagement with a trailer hitch receiver, wherein the tongue insert is engaged with a side wall of the cradle support leg and extends laterally therefrom,
a hydraulic cylinder support cradle engaged with an end of an extendible/retractable poste configured for sliding engagement with and within in the cradle support leg,
a horizontal extension brace having one end configured for engagement with the yoke at the top of the cradle support leg, and the other end having a male insert end,
a double-sided yoke configured for sliding engagement with the horizontal extension brace,
a pair of stabilizing leg foot pad yokes,
a pair of stabilizing legs having ends configured to demountable engage the double-sided yoke and the stabilizing leg foot pad yokes, and
a plurality of clevis pins for cooperating with the yoke at the top end of the cradle support leg, the horizontal extension brace, the double-sided yoke, the pair of stabilizing leg foot pad yokes, and the pair of stabilizing legs.

According to an embodiment, the components of a slide bed assembly may include:
a slide deck beam comprising an elongate beam having a pair of spaced-apart downward-extending support legs, wherein the support legs have matching equidistantly spaced-apart bores extending therealong,
a slide deck yoke for demountable engagement with the slide deck beam, the slide deck yoke provided with (i) a plurality of matching bores wherein each plurality of matching bores has a different diameter for receiving therethrough clevis pins having that diameter, and (ii) a D-ring,
a plurality of lateral support beams for demountable engagement with the downward-extending support legs of the slide deck beam, wherein the lateral support beams are configured for demountable engagement with a work bed of a service truck,
a plurality of bolts and nuts for demountable engagement of (i) the slide deck yoke with the slide deck beam and (ii) the lateral support beams with the down-ward extending support legs of the slide deck beam, In some embodiments, the kit may comprise one or more of a hydraulic oil pump and a hydraulic pump battery. In some embodiments, the kit may additionally comprise a hydraulic oil tank. In some embodiments, the kit may comprise an inlet hydraulic hose and an outlet hydraulic hose. In some embodiments, the kit may comprise one or more operating controls such as those described elsewhere herein.

Until needed for use, the torque head assembly, torque head hydraulic cylinder, hydraulic cylinder support assembly, and slide bed assembly making up the transportable, knock-down torque tool disclosed herein, can be knocked down (that is, separated) into their component parts for efficient compact storage. For example, lateral support beams may be disengaged from the slide deck assembly may be demounted from the slide deck and bundled together if so desired. The hydraulic cylinder support assembly may be knocked down by separating the horizontal extension brace from the cradle support leg and the pair of stabilizing legs after which, the separated components of the hydraulic cylinder support assembly may be bundled together if so desired.

When needed to service one or more malfunctioning hydraulic cylinders on equipment or machinery located at a work site, the slide bed assembly may be mounted onto a work surface of a service vehicle by demountably engaging the slide deck to two or more lateral support beams, and then demountably engaging the two or more lateral support beams with the work surface. The remaining component parts (torque head assembly, torque head hydraulic cylinder, hydraulic cylinder support assembly) may be loaded into or onto the service vehicle and transported to the work site, after which the torque tool can be fully assembled. For example, one end of the horizontal extension brace of the hydraulic cylinder support assembly may be demountably engaged with the end of the slide deck and the other end demountably engaged with the cradle support leg. The cradle support leg may be demountably engaged with the receiver of a trailer hitch engaged with the service truck. Then, first ends of the pair of stabilizing legs may be demountably engaged with the horizontal extension brace and the opposite ends demountably engaged with a selected support surface on the service vehicle. Then, the barrel lug at the cylinder end of torque head hydraulic cylinder may be demountably engaged with the yoke provided therefor on the cradle support leg and the rod end of the torque head hydraulic cylinder is demountably engaged with the torque head assembly after which, the assembled torque tool is ready for use to loosen piston-retaining nuts on hydraulic cylinders requiring service. After the service work is complete, the torque tool may be knocked down and transported to the service provider's facilities for storage until needed again.

As used herein, the term "on-site" refers to locations at which the hydraulic cylinder in need of service is being used. Non-limiting examples of locations include construction sites, oil and gas production sites, mining sites, forestry operations sites, agricultural sites, and the like. The locations may be in remote areas or not.

As used herein, the term "and/or" refers to and encompasses any and all possible combinations of one or more of the associated listed items (e.g. one or the other, or both), as well as the lack of combinations when interrupted in the alternative (or).

For brevity, only certain ranges are explicitly disclosed herein. However, ranges from any lower limit may be combined with any upper limit to recite a range not explicitly recited herein. Additionally, ranges from any lower limit may be combined with any other lower limit to recite a range not explicitly recited. In the same way, ranges from any upper limit may be combined with any other upper limit to recite a range not explicitly recited. Additionally, whenever a numerical range with a lower limit and an upper limit is disclosed, any number and any included range falling within the range are specifically disclosed.

In the present disclosure, all terms referred to in singular form are meant to encompass plural forms of the same unless context clearly dictates otherwise. Likewise, all terms referred to in plural form are meant to encompass singular forms of the same unless context dictates otherwise.

As used herein, the term "about", when referring to a measurable value, refers to an approximately +/−10% variation from a given value. It is understood that such a variation is always included in any given value provided herein, whether or not it is specifically referred to.

FIGURE NUMBERING KEY 10 knock-down torque tool for on-site servicing of hydraulic cylinders
20 torque head assembly
22 torque plate
22a torque plate frustoconical-ovoid-shaped aperture
22b torque plate aperture heel
22c torque plate aperture jaws
22d torque plate aperture rib connecting the torque plate jaws
22e bores for square-nut adaptor
23 torque plate aperture reinforcing cuff at center of the aperture rib
23a threaded receptacle through the aperture cuff
24 bolt
25 torque force plate
26 first plurality of bores in the torque plate and torque force plates for receiving bolts therethrough
27 bolts for engagement of the torque plate between the torque force plates
28 second plurality of force plate bores in the torque force plates for receiving a clevis pin therethrough
29 clevis pin
30 square-nut adapter fixed jaw
31 mounting plate
32 pins
33 square-nut adapter movable jaw
35 torque head hydraulic cylinder
36 hydraulic cylinder pressure gauge
38 inlet hydraulic hose
39 outlet hydraulic hose
40 hydraulic cylinder support assembly
42 horizontal extension brace
43 yoke for slidable engagement with the adjustable post for the support cradle
44 horizontal extension brace male insert end for engagement with the slide deck assembly
44a aperture through the male insert end
45 Cradle support leg
46 cradle support foot pad
47 bracing gussets for the cradle support leg and foot pad
48 cradle support foot pad bracket for engagement with an end of the torque head hydraulic cylinder
49 tongue insert for engaging a trailer hitch receiver
50 adjustable post for the hydraulic cylinder support cradle
51 hydraulic cylinder support cradle
54 double-sided yoke for sliding engagement with the horizontal extension brace and for engaging a pair of stabilizing legs for the hydraulic cylinder support assembly
56 stabilizing leg for the hydraulic cylinder support assembly
58 stabilizing leg foot pad yoke
59 hex bolt for securing the stabilizing leg to a truck bed
60 slide bed assembly for demountable engagement with a hydraulic cylinder to be serviced
62 slide deck
62a slide deck beam
62b slide deck support legs
62c equidistantly spaced bores through the slide deck support legs
64 slide bed yoke for demountable engagement with an end of a hydraulic cylinder to be serviced
64a 1st pair of bores to slidingly receive hydraulic cylinder pivot pins having 1st diameter
64b 2nd pair of bores to slidingly receive a hydraulic cylinder pivot pins having a 2nd diameter
64c 3rd pair of bores to slidingly receive a hydraulic cylinder pivot pins having a 3rd diameter
64d clevis pin
66 Bolt mounting the slide bed yoke to the slide deck beam
68 D-ring for lowering and raising the slide bed yoke to/from the slide deck beam
72 lateral support beams for the slide deck beam
72a mounting brackets to secure the slide deck to the work surface of a field service truck
72b Bracket to secure the slide deck to the lateral support plate
72c hex bolts for engaging the slide deck to the lateral support plate
72d pin for securing bracket 72b to a receiving bracket on the bed of a service truck
72e receiving bracket
80 hydraulic power unit
82 battery for the hydraulic power unit
100 working bed of a field service truck
105 trailer hitch receiver
110 hydraulic cylinder being serviced
115 hydraulic cylinder end cap
120 hydraulic cylinder square nut

What is claimed is:

1. A transportable, knock-down, torque tool apparatus for loosening and retorquing a hydraulic cylinder piston-retaining nut of a hydraulic cylinder, the apparatus comprising:
a torque head assembly configurable for demountable engagement (i) with the hydraulic cylinder piston-retaining nut, and (ii) with a torque tool hydraulic cylinder;
a slide bed assembly configurable for demountable engagement (iii) with a work surface, and (iv) with a barrel lug end of the hydraulic cylinder, the slide bed assembly resting over the work surface; and
a hydraulic cylinder support assembly configurable for demountable engagement (v) with the slide bed assembly, and (vi) with the torque tool hydraulic cylinder, an end of the hydraulic cylinder support assembly resting over a surface different in elevation from the work surface;

whereby the torque tool apparatus is operable with the torque tool hydraulic cylinder to deliver a torque force to the piston-retaining nut of hydraulic cylinder when the hydraulic cylinder is demountably engaged with the slide bed assembly and resting on the hydraulic cylinder support assembly.

2. The torque tool apparatus of claim 1, wherein the torque head assembly comprises:

two matching torque force plates, each having a matching first plurality of force plate bores at one end and a matching second plurality of force plate bores at the other end; and a torque plate having a first end with a first plurality of torque plate bores aligned with the first plurality of force plate bores, and a second end defined by a frustoconical-ovoid-shaped aperture having a flat narrow end, a pair of opposed outward-extending sides, an ovoid rib conjoining the pair of outward-extending sides, and a reinforcing collar at a midpoint of the ovoid rib, the reinforcing collar provided with a threaded bore in communication with the frustoconical-ovoid-shaped aperture; and a bolt for threadable engagement with the threaded bore in the reinforcing collar;

whereby the torque plate is demountably engageable between the two torque force plates by aligning the first plurality of bores, inserting at least two bolts therethrough and threadably engaging two nuts therewith;

wherein the torque head assembly is demountable engageable with the torque tool hydraulic cylinder aligning a rod eye of the torque tool hydraulic cylinder with a selected pair of second bores and inserting a clevis pin therethrough;

whereby a hexagonal hydraulic cylinder piston-retaining nut of a hydraulic cylinder in need of service, is demountably engageable with the torque head assembly by positioning two sides of the hexagonal piston-retaining nut between the pair of outward-extending sides of the frustoconical-ovoid-shaped aperture and threadably engaging the bolt with a third side of the hexagonal piston-retaining nut.

3. The torque tool apparatus of claim 2, wherein the torque head assembly comprises a two-component square-nut adapter for servicing hydraulic cylinders with square piston-retaining nuts, wherein:

a first component of the two-component square-nut adapter is a square-nut adapter fixed jaw configured for demountable engagement into the flat narrow end and against the pair of opposed outward-extending sides of the frustoconical-ovoid-shaped aperture of the torque plate, wherein the fixed jaw has two faces set at 90°; and a second component of the two-component square-nut adapter is a square-nut adapter movable jaw with one side configured to receive and cooperate with the end of the bolt, and the opposite side having two faces set at 90°;

whereby a square hydraulic cylinder piston-retaining nut of a hydraulic cylinder is demountably engageable with the torque head assembly by positioning two sides of the square piston-retaining nut against the two faces of the square-nut adapter fixed jaw and the other two sides of the piston-retaining nut against two faces of the square-nut adapter movable jaw and threadably engaging the bolt against the other side of the movable jaw.

4. The torque tool apparatus of claim 1, wherein the slide bed assembly includes:

an elongate slide deck having a slide deck yoke extending upward therefrom and with a pair of elongate slide deck support legs extending downward therefrom, said pair of support legs having a matched pairs of equidistantly spaced bores therealong, said slide deck yoke configured for demountable engagement with the barrel lug end of the hydraulic cylinder needing service; and two or more lateral support beams for demountable engagement with the elongate slide deck, and for demountable engagement with the work surface.

5. The torque tool apparatus of claim 1, the hydraulic cylinder support assembly comprises:

a cradle support leg having (i) a bottom end integrally engaged with a foot pad and a pair of bracing gussets, said foot pad provided with a bracket for demountable engagement therewith the torque tool hydraulic cylinder, (ii) an upper end integrally engaged with a yoke extending laterally therefrom, and (iii) a tongue insert disposed laterally from a side of the cradle support leg, said tongue insert configured for demountable engagement with a receiver of a trailer hitch engaged with a service vehicle;

an elongate post having one end configured for retracting into and out of the cradle support leg, and the other end having a hydraulic cylinder support cradle engaged therewith;

a horizontal extension brace having one end configured for demountable engagement with the yoke on the cradle support leg, and the other end having a male insert extending therefrom for demountable engagement therewith the slide bed assembly;

a double-sided yoke slidingly engageable with the horizontal extension brace; and a pair of stabilizing legs configured for demountable engagement with the double-sided yoke, and a pair of foot pads provided therefor.

6. The torque tool apparatus of claim 1, additionally comprising the torque tool hydraulic cylinder.

7. The torque tool apparatus of claim 1, additionally comprising a hydraulic power unit, a battery for powering the hydraulic power unit, and a pressure gauge for communication with the hydraulic power unit.

8. The torque tool apparatus of claim 1, wherein the hydraulic cylinder support assembly is removably coupled with a receiver of a trailer hitch engaged with a service vehicle.

* * * * *